(12) United States Patent
Ishii

(10) Patent No.: US 6,775,532 B2
(45) Date of Patent: Aug. 10, 2004

(54) COMMUNICATION APPARATUS WITH AN RF TRANSMISSION SECTION OPERATED BY SECOND AND THIRD CLOCK SIGNALS

(75) Inventor: Satoru Ishii, Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 326 days.

(21) Appl. No.: 09/793,502

(22) Filed: Feb. 27, 2001

(65) Prior Publication Data

US 2001/0017884 A1 Aug. 30, 2001

(30) Foreign Application Priority Data

Feb. 28, 2000 (JP) ........................................ 2000-052050

(51) Int. Cl.[7] .............................. H04Q 7/20; H04L 5/16
(52) U.S. Cl. ...................................... 455/403; 375/219
(58) Field of Search ................................ 375/219, 376; 128/710; 320/133; 713/322; 455/403, 454, 414

(56) References Cited

U.S. PATENT DOCUMENTS

| | | | |
|---|---|---|---|
| 5,479,479 A | * | 12/1995 | Braitberg et al. |
| 5,678,562 A | * | 10/1997 | Sellers .......................... 128/710 |
| 2001/0017884 A1 | * | 8/2001 | Ishii ............................ 375/219 |

* cited by examiner

Primary Examiner—William Cumming
(74) Attorney, Agent, or Firm—Oblon, Spivak, McClelland, Maier & Neustadt, P.C.

(57) ABSTRACT

A communication apparatus capable of realizing a reduction in power consumption thereof. At least a wireless unit control command analysis/processing section which is operable at a low-speed clock is constituted by a logic circuit. The wireless unit control command analysis/processing section is fed with a low-speed clock as an operation clock therefor. This leads to a reduction in power consumption of the wireless unit control command analysis/processing section.

8 Claims, 4 Drawing Sheets

COMMUNICATION APPARATUS WITH AN RF TRANSMISSION SECTION OPERATED BY SECOND AND THIRD CLOCK SIGNALS

BACKGROUND OF THE INVENTION

1. Field of the Invention

This invention relates to a communication apparatus, and more particularly to a communication apparatus for carrying out data communication between a data terminal equipment and a controlled equipment using a radio wave.

2. Discussion of the Background

Various types of data communication have been conventionally carried out using a radio wave between a controlled equipment and a data terminal equipment. In this instance, a communication apparatus is provided for each of the controlled equipment and data terminal equipment.

Now, such a conventional communication apparatus will be described with reference to FIG. 4. A communication apparatus generally designated at reference numeral 100 in FIG. 4 includes an input terminal for a data terminal equipment (DTE input terminal) designated at reference numeral 101 which is adapted to receive input data from a data terminal equipment (DTE) (not shown) and a central processing unit (CPU) 103 for carrying out control of the whole communication unit 100.

The CPU 103 is provided therein with a read only memory (ROM) 104a for storing a variety of programs therein and a random access memory (RAM) 104b in which input data inputted through the DTE input terminal 101 to the CPU 103 are temporarily stored. Also, the CPU 103 has a predetermined operation clock inputted thereto from a clock generator.

The communication unit 100 also includes a command analysis processing block 106 which functions to subject a command transmitted thereto through a bus line to analysis processing and transfer results of the analysis processing to the CPU 103.

Reference numeral 107 designates an RF control block which functions to subject command data transmitted through a bus line thereto to control of various types. For example, the RF control block 107 controls an RF modem or modulator demodulator 108 acting as a data circuit terminating equipment and a phase locked loop (PLL) circuit section 109b arranged in an RF circuit section 109a.

As data to be transmitted to a controlled equipment (not shown) through a bus line, transmission data in the form of a predetermined signal are prepared, for example, when command data, text data or the like are transmitted.

The RF modem block 108 modifies transmission data transmitted from the RF control block 107 through a bus line thereto according to a predetermined modulation system and then outputs it in the form of a base band signal (DC digital signal).

In the RF circuit section 109a, a predetermined transmission channel is selected from predetermined plural transmission channels by the PLL circuit section 109b. Also, the RF circuit section 109a converts a base band signal (digital signal) fed from the RF modem block 108 thereto into an analog data signal. Further, the RF circuit section 109a modifies a carrier by means of the analog data signal and transmits it from an antenna 120 through an antenna terminal 110.

In the conventional communication unit 100 shown in FIG. 4, a digital processing block constituted by, for example, the CPU 103, command analysis processing block 106, RF control block 107 and RF modem block 108 surrounded by broken lines in FIG. 4 is normally constituted by a one-chip microcomputer 102. In this instance, operation of the one-chip microcomputer 102 is controlled by a single operation clock fCK, so that an operation clock for the one-chip microcomputer 102 is set at a highly increased operation speed which permits processing required in each of the processing blocks to be attained.

It is generally known that electric power consumed by an integrated circuit (IC) such as a microcomputer or the like is determined depending on a gate size of the IC and an operation clock therefor. For example, when power consumption of the IC, the gate size and the operation clock are indicated at P, Gs and fCK, respectively, power consumption P of the IC is represented by the following expression:

$$P = Gs \times fCK \times k$$

wherein k is a constant. Thus, the integrated circuit is increased in power consumption with an increase in speed of the operation clock fCK.

Therefore, the one-chip microcomputer 102 in which an operation clock increased in speed is fed even to a processing block operable at a low speed has a disadvantage of being increased in whole power consumption.

In particular, in the conventional communication unit 100 described above, an operation clock for the command analysis processing block 106 is set to be 20 kHz, whereas an operation clock for the RF modem block 108 is set at a level as high as 1.1 MHz. Thus, for example, conformation or correspondence of an operation speed of the one-chip microcomputer 102 to that of the RF modem block 108 leads to waste power consumption, because a high-speed clock is used as a whole.

SUMMARY OF THE INVENTION

The present invention has been made in view of the foregoing disadvantage of the prior art.

Accordingly, it is an object of the present invention to provide a communication apparatus which is capable of being significantly reduced in power consumption.

In accordance with the present invention, a communication apparatus is provided. The communication apparatus includes a data input terminal for receiving a command outputted from a data terminal unit, a command analysis processing section for subjecting the command inputted thereto through the data input terminal to analysis processing, a control section for carrying out required control depending on command data analyzed in the command analysis processing section, command data to be transmitted of command data analyzed in the command analysis processing section, and an RF transmission section for transmitting transmit data in the form of a predetermined signal. At least the command analysis processing section is constituted by a logic circuit operated by a predetermined clock signal.

As described above, in the present invention, at least the command analysis processing section is constituted by a logic circuit and a low-speed clock signal is fed to the command analysis processing section for operation thereof. Thus, the communication apparatus of the present invention eliminates waste power consumption caused by the conventional command analysis block, leading to a reduction in power consumption.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a communication apparatus according to the present invention will be described with reference to FIGS. 1 to 3.

Figure 1:
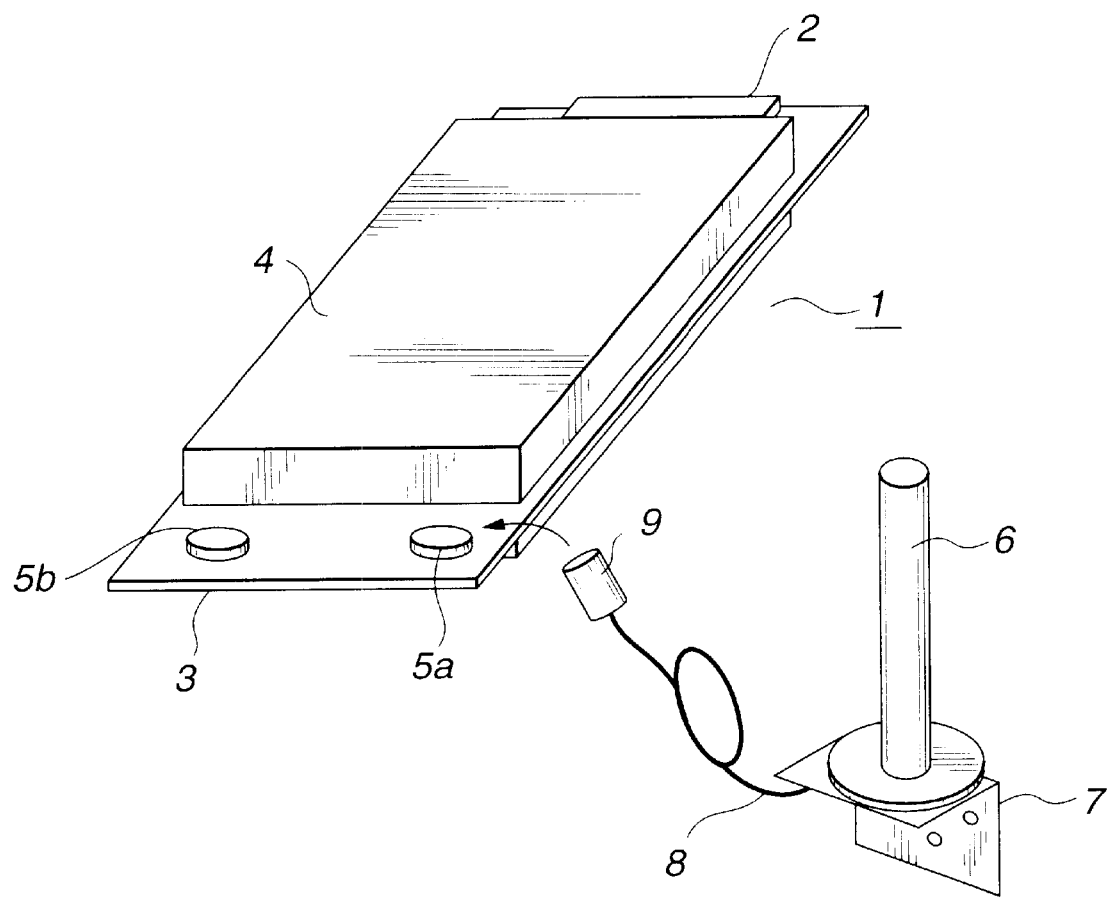
FIG. 1 is a schematic perspective view showing an embodiment of a communication apparatus according to the present invention.
Figure 2:
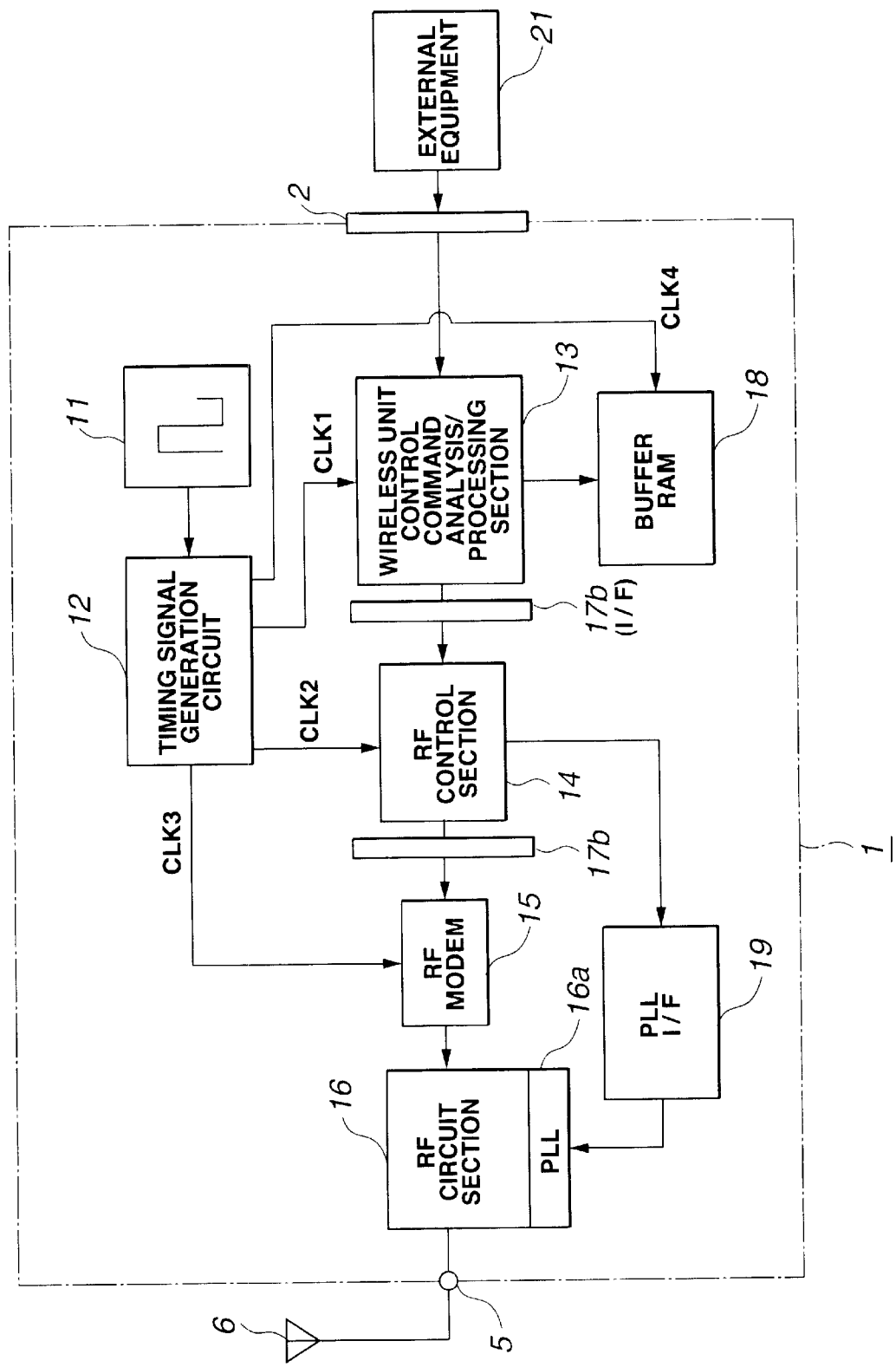
FIG. 2 is a block diagram of the communication apparatus shown in FIG. 1.

Referring first to FIGS. 1 and 2, an embodiment of a communication apparatus according to the present invention is illustrated. A communication apparatus of the illustrated embodiment generally designated at reference numeral 1 includes a base plate or substrate 3 and a DTE input terminal (connector) 2 mounted on the substrate 3 so as to act as an external interface. Also, the substrate 3 is mounted thereon with a shield casing 4, which cooperates with the substrate 3 to define a space therebetween while shielding the space from an exterior. The space in the shield casing 4 has circuit blocks arranged therein as described hereinafter.

The communication apparatus 1 of the illustrated embodiment employs a so-called diversity reception system which utilizes, for example, two or more receive waves as techniques of reducing an effect of fading. For this purpose, the substrate 3 is provided thereon with two antenna terminals 5a and 5b, to which antennas 6 are attached, respectively.

The antennas 6 each are fixedly supported on a fixture 7 and at any desired position on the substrate 3 through the fixture 7. In this instance, the antennas 6 each are connected through a cable 8 to each of the antenna terminals 5a and 5b. The antennas 6 each may be mounted directly on each of the antenna terminals 5a and 5b.

In the illustrated embodiment, only one set of the antennas 6 is arranged. However, when such a diversity reception system as described above is employed in the illustrated embodiment, the antennas of sets corresponding in number to sets of the antenna terminals are arranged. When the diversity reception system is not employed, arrangement of only one set of the antennas 6 is merely required.

Now, the communication apparatus 1 of the illustrated embodiment will be further described with reference to FIG. 2. The communication apparatus 1 is so constructed that the DTE input terminal 2 is connected to a data terminal unit 21 acting as an external equipment by way of example, so that input data may be inputted from the data terminal unit 21 to a wireless unit control command analysis/processing section 13.

A configuration of the DTE input terminal 2 is determined in view of a configuration of, for example, RS 232C. Also, the data fed from the data terminal unit 21 are in the form of serial data and have a maximum transmission speed of 115.2 KBPS.

The input data fed from the data terminal unit 21 may be text data, a predetermined DTE command or the like which is transmitted to a controlled equipment (not shown). In this instance, one-character (one-word) data contained in the input data are constituted by 9-bit serial data.

Thus, a transmission speed of the one-character data fed from the data terminal unit 21 is 12.8 KCPS (=115.2 KBPS/9 bits).

An operation voltage in the communication apparatus 1 of the illustrated embodiment is fed from the data terminal unit 21 through the DTE input terminal 2.

The wireless unit control command analysis/processing section 13 may be constituted by, for example, a logic circuit and functions to carry out analysis processing of a wireless unit control command contained in the input data fed from the data terminal unit 21. Also, the wireless unit control command analysis/processing section 13 functions to transmit command identification data obtained by the analysis processing to an RF control section 14 through an interface 17a.

The wireless unit control command analysis/processing section 13, of which a structure will be described hereinafter, detects, for example, a character string formed by a command contained in the input data fed from the data terminal unit 21 for every one-character data unit, to thereby carry out analysis processing of the command.

For this purpose, the wireless unit control command analysis/processing section 13 has a clock of 20 kHz about 1.5 times as large as a transfer rate (12.8 KCPS) for one-character data fed thereto as an operation clock CKL1 required for carrying out analysis processing for every one-character data unit from a timing signal generation circuit 12.

A buffer RAM 18 is arranged so as to act as a memory for temporarily storing therein input data fed thereto through the DTE input terminal 2. In the illustrated embodiment, the buffer RAM 18 as well may be constituted by a logic circuit and has an operation clock CLK4 of 100 kHz fed thereto from the timing signal generation circuit 12 by way of example.

The RF control section 14 as well may be constituted by a logic circuit and carries out various kinds of control depending on command data fed thereto through the DTE interface 17a. For example, the RF control section 14 may carry out control of an RF modem 15 through a DCE interface (I/F) 17b and control of a PLL circuit section 16a incorporated in an RF circuit section 16 through a PLL interface 19.

Further, the RF control section 14 prepares transmit data in the form of a predetermined signal which acts as transmit data to be transmitted to the controlled equipment (not shown), to thereby output it through the DCE interface 17b to the RF modem 15, when a command, text data or the like is fed thereto through the DTE interface 17a. In this instance, the RF control section 14 has an operation clock CLK2 of 200 kHz fed thereto from the timing signal generation circuit 12 by way of example.

The RF modem 15 is likewise constituted by a logic circuit. The RF modem 15 functions to permit transmit data fed thereto through the DCE interface 17b due to control by the RF control section 14 to be modulated according to, for example, a frequency shift keying (FSK) system and then outputted in the form of a base band signal (DC digital signal) therefrom. In this instance, the RF modem 15 has an operation clock CLK3 of 1.1 MHz fed thereto from the timing signal generation circuit 12.

In the RF circuit section 16, of a plurality of predetermined transmit channels (transmit frequencies), a predetermined transmit channel is selected by the PLL circuit section 16a. Then, the RF circuit section 16 converts a base band signal (digital signal) fed thereto from the RF modem 15 into an analog data signal and then subjects a carrier to modulation according to a predetermined modulation system by means of the thus-obtained analog data signal, followed by transmission of the modulated carrier from the antennas 6 through the antenna terminals 5. The RF circuit section 16 employs a spread spectrum (SS) system widely known in the art as a radio system by way of example. Also, a communication system therefor may be, for example, a simplex communication system.

Figure 4:
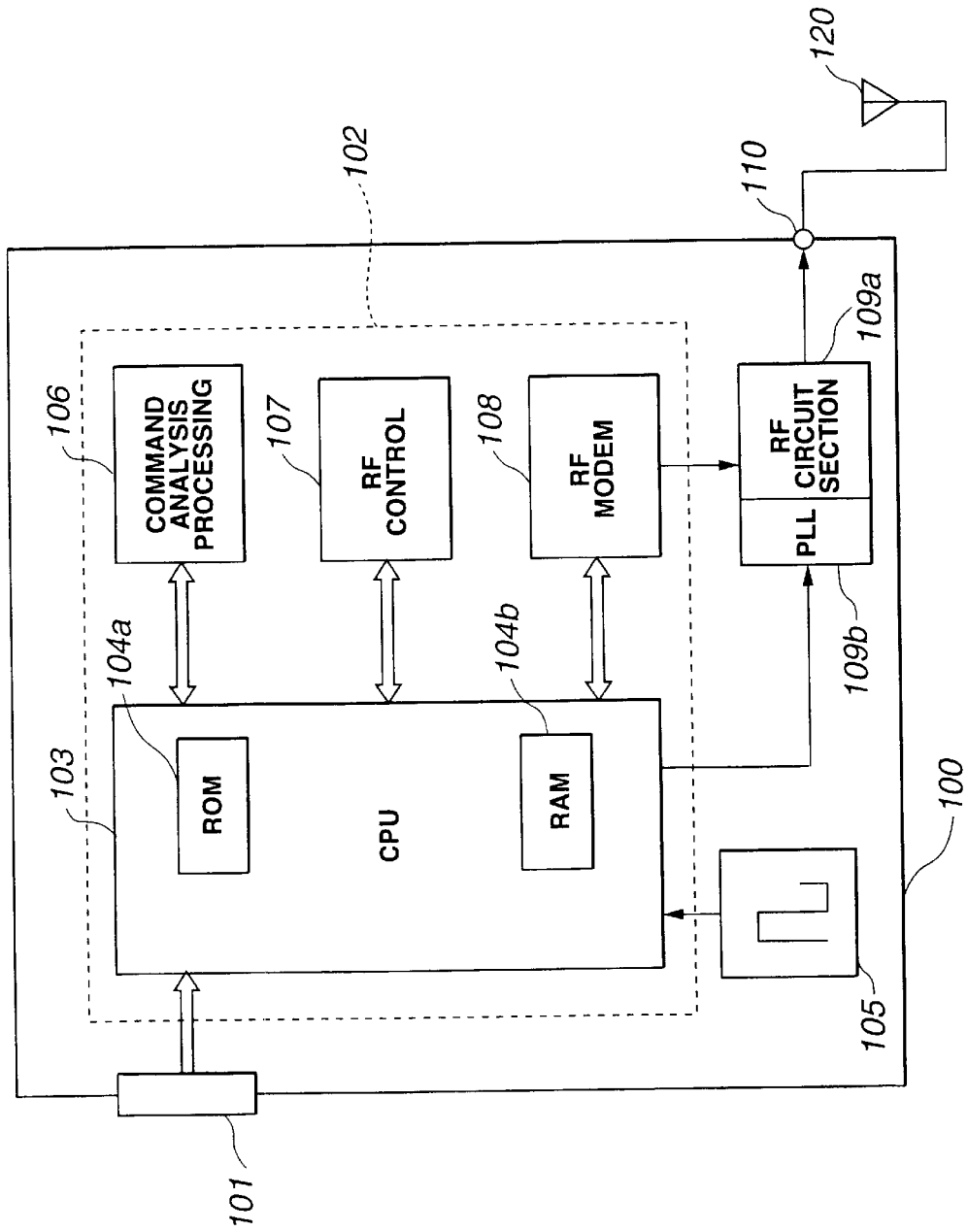
FIG. 4 is a block diagram showing a conventional communication apparatus.

In the communication apparatus 1 of the illustrated embodiment thus constructed, the digital blocks each are constituted by a logic circuit, unlike the conventional communication apparatus 100 (FIG. 4) wherein the digital blocks are constituted by the one-chip microcomputer 102. Also, in the illustrated embodiment, the digital circuit sections each are fed with an appropriate operation clock. Thus, the illustrated embodiment permits a stream of a signal to be controlled by means of a small scale CPU (not shown) or all kinds of operation control to be carried out by means of the logic circuits without a CPU.

For example, appropriate clocks of 20 kHz, 700 kHz and 1.1 MHz are fed to the wireless unit control command analysis/processing section 13, RF control section 14 and RF modem 15, respectively, so that the digital circuit sections may be operated by means of the appropriate operation clocks, respectively.

This leads to a reduction in power consumption in the digital circuit sections, as compared with the conventional communication apparatus 100 wherein the digital blocks are constituted by the one-chip microcomputer 102, to thereby be operated by means of high-speed operation clocks.

For example, supposing that a current consumed by the one-chip microcomputer 102 constituting the digital blocks of the conventional communication apparatus 100 is 50 mA, the communication apparatus 1 of the illustrated embodiment permits a current consumed by the digital circuit sections to be reduced to a level as low as about 3 mA to about 5 mA. Thus, electric power consumed by the digital circuit sections may be reduced to a level of between about 150 mW and about 12 mW.

In particular, the wireless unit control command analysis/processing section 13 of a relatively large circuit scale is constituted by a logic circuit and operated by means of an appropriate operation clock (20 kHz), so that power consumption by the digital circuit section may be substantially reduced.

Further, the communication apparatus 1 of the illustrated embodiment may be constructed so as to exclude redundancy blocks incorporated in the RF circuit section 16 therefrom as much as possible and reduce a current consumed by each of amplifiers. Such construction permits a current (power) consumed by the RF circuit section to be reduced to a level as low as 300 mA to 30 mA (0.9 W to 90 mW).

In the communication apparatus 1 of the illustrated embodiment, the logic circuits each are designed using a description language for logic design which is known as a VHDL (VHSIC hardware description language) in the art. This permits accommodation of a retarget or system-on-silicon to another IC for specific applications (ASIC) in the form of an IP.

Now, the wireless unit control command analysis/processing section 13 which is constructed so as to analyze a three-bite command as input data thereof by way of example will be described with reference to FIG. 3. First logic detection circuits 31 (31a, 31b and 31d) in FIG. 3 each function to detect character data to which first-bite data of a command inputted thereto correspond.

Figure 3:
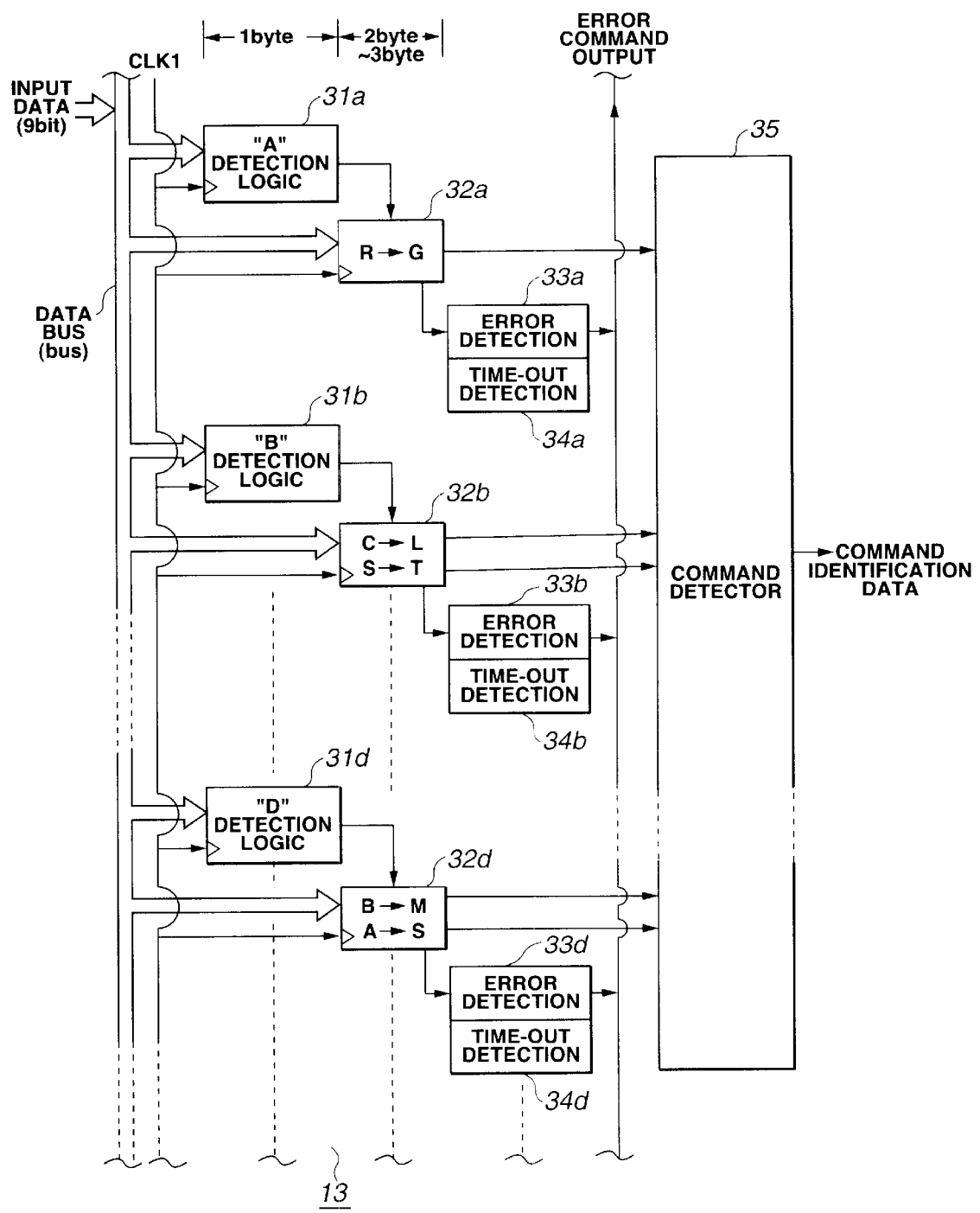
FIG. 3 is a block diagram showing a wireless unit control command analysis/processing section in the communication apparatus shown in FIG. 1.

In FIG. 3, the first logic detection circuits 31 include a first logic detection circuit 31a for detecting whether the first-bite data are "A" character data, a first logic detection circuit 31b for detecting whether the first-bite data are "B" character data and a first logic detection circuit 31d for detecting whether the first-bite data are "D" character data. In practice, the wireless control command analysis/processing section is provided therein with logic detection circuits for detecting characters present in first-bite data of a command inputted thereto.

The logic detection circuits 31a, 31b and 31d each have input data and an operation clock CLK1 (20 kHz) fed in parallel from the data terminal unit 21 and timing generation circuit 12, respectively. This permits each of the logic detection circuits 31a, 31b and 31d to carry out detection of character data to which the first-bite (9 bits) data correspond. When the logic detection circuits 31a, 31b and 31d detect the corresponding character data, they output detection signals which render second logic detection circuits 32 (32a, 32b and 32d) turned on.

The second logic detection circuits 32 (32a, 32b and 32d) function to detect whether, for example, second-bite and third bite data correspond to predetermined character data. For this purpose, the second logic detection circuits 32a, 32b and 32d each have input data and an operation clock CLK1 fed in parallel thereto from the data terminal unit 21. Operations of the second logic detection circuits 32a, 32b and 32d are controlled by ON signals outputted from the first logic detection circuits 31a, 31b and 31d, respectively.

In this instance, the second logic detection circuit 32a detects whether, for example, the second-bite data inputted thereto are character data corresponding to character "R" and the third-bite data are character data corresponding to character "G". Also, the second logic detection circuit 32b detects whether, for example, the second-bite and third-bite data correspond to either character data "C" and "L" or character data "S" and "T". Further, the second logic detection circuit 32d detects whether, for example, the second-bite and third-bite data correspond to either character data "B" and "M" or character data "A" and "S".

The second logic detection circuits 32a, 32b and 32d each output a detection signal to a command detector 35, when, for example, the second-bite and third-bite input data coincide with predetermined data.

In the command detector 35, command identification data which correspond to all commands are held by, for example, a table. Thus, the command detector 35 functions to output command identification data corresponding to detection signals fed from the second logic detection circuits 32a, 32b and 32d. The command identification data thus generated are fed through the DTE interface 17a shown in FIG. 1 to the RF control section 14. This results in required processing which corresponds to the command identification data being executed in the RF control section 14.

When the second logic detection circuits 32a, 32b and 32d detect that, for example, the second-bite and third-bite input data do not coincide with predetermined character data or when so-called time-out that the second-bite or third-bite data are not obtained in a predetermined period of time occurs, the second logic detection circuits output detection signals to error detection circuits 33a, 33b and 33d. In this instance, the error detection circuits 33a, 33b and 33d each output an error command to, for example, the RF control section 14.

Supposing that, for example, "B, C and L" commands are fed from a data terminal unit 21 to the wireless unit control command analysis/processing section 13 for operation of the wireless unit control command analysis/processing section 13, the first logic detection circuits 31a, 31b and 31d each have character data on "B" inputted thereto as first-bite data. In this instance, it is the first logic detection circuit 31b that can detect the character data on "B", thus, a detection signal is outputted from the first logic detection circuit 31b to only the second logic detection circuit 32b.

This permits only the second logic detection circuit 32b to be operable at timings of inputting of the second-bite and third-bite data. When, for example, character data on or corresponding to "C" and character data on "L" are detected as the second-bite data and third-bite data, respectively, a detection signal is outputted to the command detector 35. Thus, the data detector 35 detects that the "B, C and L" commands are inputted to the wireless unit control command analysis/processing section 13, resulting in outputting command identification data corresponding to results of the detection.

The above-described construction of the wireless unit control command analysis/processing section 13 is merely illustrative, therefore, it may be constructed in any other suitable manner. For example, the illustrated embodiment is so constructed that the second logic detection circuits 32 detect the second-bite and third-bite data. Alternatively, a logic detection circuit for detecting the second-bite data and that for detecting the third-bite data may be provided separately from each other.

Also, in the illustrated embodiment, input data generated from the data terminal unit 21 are transmitted to the communication unit of the controlled equipment (not shown). Alternatively, the communication apparatus of the present invention may be constructed so as to receive transmit data from the communication unit of the controlled equipment to transmit the data to the data terminal unit. In this instance, various data are transmitted along a signal path contrary to that described above.

As can be seen from the foregoing, the communication apparatus of the present invention is so constructed that at least the command analysis processing section is constituted by a logic circuit and a low-speed clock signal is fed to the command analysis processing section for operation thereof. Thus, the communication apparatus of the present invention eliminates waste power consumption caused by the conventional command analysis block, leading to a reduction in power consumption.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A communication apparatus comprising:
a data input terminal for receiving a command output from a data terminal unit;
a command analysis processing section for subjecting the command input thereto through said data input terminal to analysis processing, to thereby generate command data;
a control section for receiving the generated command data from the command analysis processing section, and for carrying out required control based on the command data analyzed in said command analysis processing section, to thereby generate transmit data;
an RF transmission section for receiving the transmit data from the control section and for transmitting the transmit data in a form of a predetermined signal;
at least said command analysis processing section being constituted by a logic circuit operated by a first predetermined clock signal, and said control section and RF transmission section operated by respective second and third predetermined clock signals, the first predetermined clock signal being of a lower frequency than the second and third predetermined clock signals.

2. A communication apparatus according to claim 1, wherein the second predetermined clock signal is lower in frequency than the third predetermined clock signal.

3. A communication apparatus according to claim 1, further comprising a buffer RAM connected to the command analysis processing section for storing data input to the command analysis processing section.

4. A communication apparatus according to claim 1, wherein the control section is constituted by a logic circuit.

5. A communication apparatus according to claim 1, wherein the RF transmission circuit is constituted by a logic circuit.

6. A communication apparatus comprising:
first means for receiving a command output from a data terminal unit;
second means for subjecting the command input thereto through said data input terminal to analysis processing, to thereby generate command data;
third means for receiving the generated command data from the second means and for carrying out required control based on the command data analyzed in said command analysis processing section, to thereby generate transmit data;
fourth means for receiving the transmit data from the third means and for transmitting the transmit data in a form of a predetermined signal;
at least said second means being constituted by a logic circuit operated by a first predetermined clock signal, and said third means and fourth means operated by respective second and third predetermined clock signals, the first predetermined clock signal being of a lower frequency than the second and third predetermined clock signals.

7. A communication apparatus according to claim 6, wherein the second predetermined clock signal is lower in frequency than the third predetermined clock signal.

8. A communication apparatus according to claim 6, further comprising fifth means connected to the second means for storing data input to the command analysis processing section.

* * * * *

UNITED STATES PATENT AND TRADEMARK OFFICE
CERTIFICATE OF CORRECTION

PATENT NO. : 6,775,532 B2 Page 1 of 1
DATED : August 10, 2004
INVENTOR(S) : Ishii It is certified that error appears in the above-identified patent and that said Letters Patent is hereby corrected as shown below:

Title page, Item [54] and Column 1, Line 1,

Title should read:
-- TWO-WAY WIRELESS COMMUNICATION APPARATUS --

Signed and Sealed this

Nineteenth Day of October, 2004

JON W. DUDAS
*Director of the United States Patent and Trademark Office*